United States Patent
Böhmer et al.

(10) Patent No.: US 7,054,650 B2
(45) Date of Patent: May 30, 2006

(54) METHOD FOR OBTAINING PRESENCE DATA

(75) Inventors: Bernhard Böhmer, Berlin (DE); Andreas Hauptvogel, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 242 days.

(21) Appl. No.: 10/651,025

(22) Filed: Aug. 29, 2003

(65) Prior Publication Data

US 2004/0107075 A1 Jun. 3, 2004

(30) Foreign Application Priority Data

Sep. 2, 2002 (DE) ............................. 102 41 097

(51) Int. Cl.
*H04Q 7/20* (2006.01)

(52) U.S. Cl. ............................. 455/456.3; 455/456.2; 455/432.3

(58) Field of Classification Search ............. 455/456.1, 455/456.2, 465.3, 456.5, 466, 432.3; 709/227, 709/237, 200, 223, 224, 206; 707/10, 1; 705/14, 28, 21; 370/410, 392, 401, 466; 340/531, 573.1, 539.13

See application file for complete search history.

(56) References Cited

U.S. PATENT DOCUMENTS 5,905,866 A * 5/1999 Nakabayashi et al. ...... 709/223
6,002,941 A * 12/1999 Ablay et al. ................ 455/518
6,363,255 B1 * 3/2002 Kuwahara ................ 455/456.5
6,430,595 B1 * 8/2002 Ferguson et al. ........... 709/200
6,453,347 B1 * 9/2002 Revashetti et al. ......... 709/224
6,813,501 B1 * 11/2004 Kinnunen et al. ....... 455/456.2

FOREIGN PATENT DOCUMENTS

WO WO 01/72055 9/2001
WO WO 02/43351 5/2002

OTHER PUBLICATIONS

3GPP TS 23.141 V0.0.0 3rd Generation Partnership Project; Technical Specification Group Services and System Aspects; Presence Service; Architecture an Functional Description (Release 6) Jun. 2002.

* cited by examiner

Primary Examiner—Jean Gelin
(74) Attorney, Agent, or Firm—Morrison & Foerster LLP (57) ABSTRACT

A method for obtaining presence data for processing in a presence computer, in which a communications terminal accesses a service computer to use a service which is offered by it. The service computer identifies the occurrence of a predetermined service state which identifies the communications subscriber and sends a presence message to the presence computer, which presence message includes information about the service state that has occurred and about the communications terminal.

12 Claims, 4 Drawing Sheets

| State | Predetermination | Info |
|---|---|---|
| 1 | 1 | Accessible by mail |
| 2 | 0 | |
| 3 | 0 | |
| 4 | 0 | |
| 5 | 0 | |
| 6 | 0 | |
| 7 | 1 | Location |
| 8 | 1 | Not accessible by mail |

Fig. 5

METHOD FOR OBTAINING PRESENCE DATA

CLAIM FOR PRIORITY

This application claims priority to German Application No. 10241097.6 which was filed in the German language on Sep. 2, 2002.

TECHNICAL FIELD OF THE INVENTION

The invention relates to a method for obtaining presence data for further processing in a presence computer.

BACKGROUND OF THE INVENTION

The document 3GPP TS 23.141 V0.0.0. "3rd Generation Partnership Project; Technical Specification Group Services and System Aspects; Presence Service; Architecture and Functional Description (Release 6)" dated June 2002 discloses a service which is referred to as a "presence service" in which a presence computer (presence server) monitors characteristics of selected communications subscribers. Such characteristics include, for example, the respective current accessibility by telephone, by the short message service (SMS) or by e-mail. Information about such characteristics is gathered and is transmitted in the form of presence data to communications terminals which require such presence data. Chapters 4 and 5, in particular, describe how such information can be provided by the selected communications subscribers, by technical facilities (for example switching centres, home location registers) in a mobile radio network, or by technical facilities (for example calendar applications of a service provider) arranged outside the mobile radio network.

SUMMARY OF THE INVENTION

The invention specifies a method which can be used in a versatile manner for obtaining presence data. According to on embodiment of the invention, there is a method for obtaining presence data for further processing in a presence computer, in which a communications terminal accesses a service computer in order to use a service which is offered by it, the service computer identifies the occurrence of a predetermined service state which identifies the communications subscriber and sends a presence message to the presence computer, which presence message includes information about the service state that has occurred and about the communications terminal, and the presence computer processes the information in the presence message to form presence data. In this case, it is advantageous that accesses by the communications subscriber to a service computer can be used for utilization of the service which is offered by the service computer for obtaining presence data. In this case, the service computer identifies when the predetermined service state is reached on the basis of the access, so that information about the fact that the service state has occurred can be sent to the presence computer. This advantageously makes it possible to evaluate use at the communications terminal end of widely differing services by the communications terminal, in order to generate presence data.

In another embodiment of the invention, the presence computer transmits a definition message to the service computer, which includes information about the service states to be identified by the service computer, the service computer then identifies these service states as predetermined service states and the service is monitored for the occurrence of these predetermined service states. In this embodiment of the method, the presence computer advantageously defines which service states should be regarded as predetermined service states and those service states about which the presence computer will receive information when these service states are reached. The presence computer thus has control over the information that is to be sent to it. This avoids the collection, transmission and processing by the presence computer of unnecessary information, and the unnecessary system loading resulting from this.

The invention can also be designed such that the service computer identifies from a set of service states those service states as predetermined service states which will result in a change in the accessibility of the communications terminal, and the service is monitored for the occurrence of these predetermined service states. In this embodiment according to the invention, the service computer advantageously determines which service states are suitable for use as predetermined service states and the service states which the service must then monitor for, thus relieving the presence computer of this task. In this case, the accessibility of the communications terminal by other communications terminals is used as the criterion for identification of such predetermined service states.

The method according to the invention can also be implemented such that the service computer reads state data which is stored in a service computer program, with this state data including information about those service states which occur during the running of the service computer program on the service computer. In this embodiment, stored state data is used together with the service computer program in the service computer in order to obtain information about the respective states of the service computer program. The service computer program thus includes the information which is required for the service computer to determine the predetermined service state, and this is particularly advantageous when replacing the service program by a new service program version to which additional states have been added.

In the method according to the invention, the service computer can use a signaling message to transmit information about the predetermined service states to the presence computer. This preferably allows the presence computer to be informed of the predetermined service states about which information may potentially be transmitted from the service computer to the presence computer at a later time.

The method according to the invention can be implemented such that the occurrence of a predetermined service state is identified by the communications subscriber registering as a service user with the service computer, when the communications subscriber starts a service computer program on the service computer, or when the communications subscriber ends a service computer program on the service computer. A change to the current accessibility of the communications subscriber can in each case advantageously be determined in a particularly simple manner on the basis of these three actions.

In one preferred embodiment of the method according to the invention, a service in the form of a value added service is accessed, going beyond merely providing basic communication functions for the communications terminal. This advantageously allows the often wide-ranging and extensive accesses and data inputs by the communications subscriber when using a value added service also to be used to obtain the presence data relating to the current accessibility of the subscriber.

A service computer which forms a node of a mobile radio network which is connected to the presence computer can be used for the method according to the invention.

However, the method according to the invention can also be designed such that the service computer is connected via an open interface to a mobile radio network which is connected to the presence computer. In this case, the expression an open interface refers to an interface whose interface description is open and is thus freely accessible to interested third parties. Third parties can thus use this interface for connection of their network-external service computer. This embodiment is advantageous since it is possible to use those services for obtaining presence data which are not offered by an operator in the mobile radio network but are offered by an autonomous service provider (referred to as a third party service provider) by means of a service computer which is external to the mobile radio network.

An open interface such as this may be implemented by means of an OSA/Parlay Gateway.

BRIEF DESCRIPTION OF THE DRAWINGS

In order to explain the invention in more detail, exemplary drawings are provided in which.

DETAILED DESCRIPTION OF THE INVENTION

Figure 1:
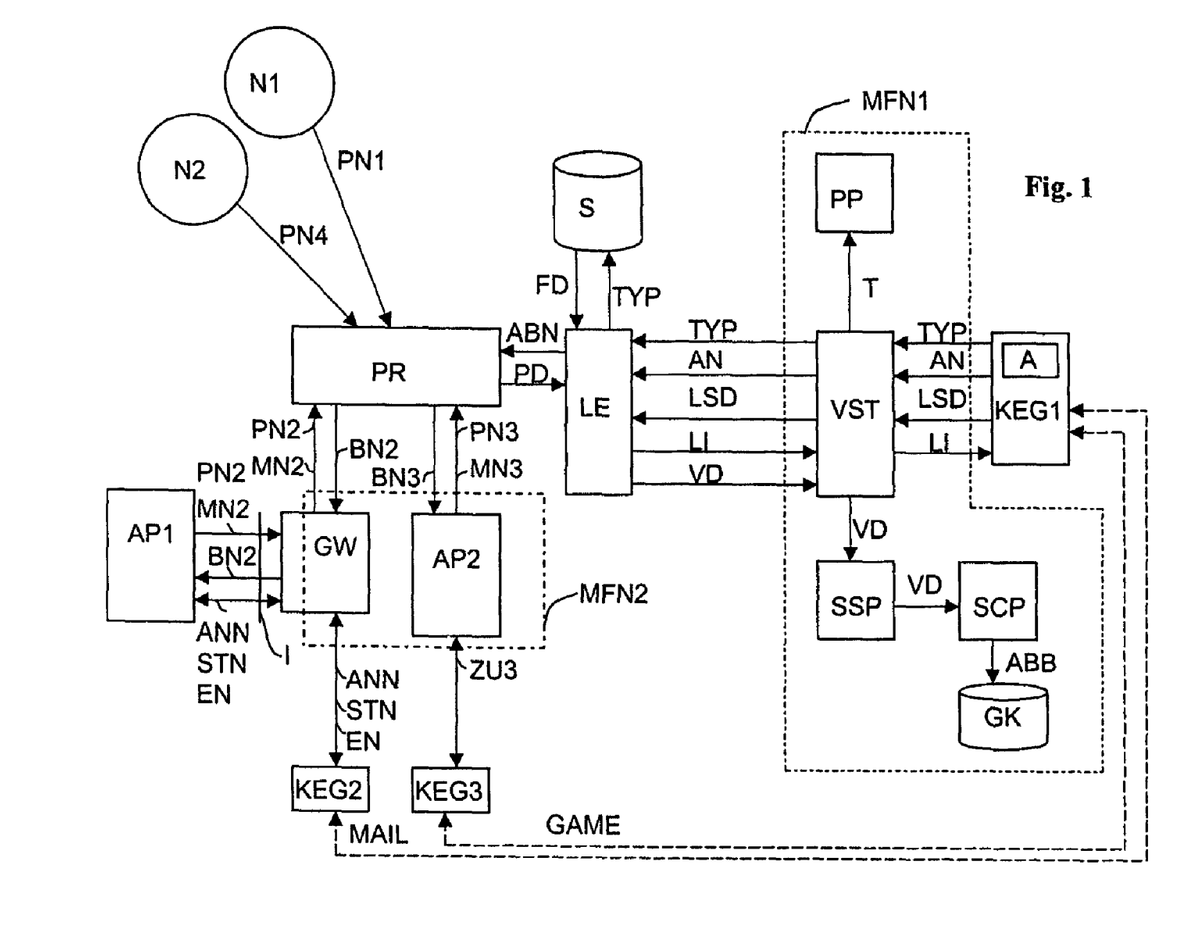
FIG. 1 shows one exemplary embodiment of the method according to the invention.

A destination communications terminal KEG1 with a display unit A is shown on the right-hand side of FIG. 1. The destination communications terminal KEG1 is connected to a first communications network MFN1 which has the structure of an intelligent network (IN). The first communications network MFN1, which is a mobile radio network, has a first switching center VST, a service switching point SSP, a service control point SCP, a prepaid charge account GK (referred to as a prepaid account) and a charge credit device PP (a billing center for carrying out what is referred to as a postprocessing billing process).

When the destination communications terminal KEG1 requires presence data about other communications terminals (for example about a communications terminal KEG2 that is illustrated by way of example or about a further communications terminal KEG3), then the destination communications terminal KEG1 transmits a selection message AN via the switching center VST in the first communications network MFN1 to a list generating device LE. The list generating device LE carries out a service in the form of creating a list LI, with the list being used to represent presence data for communications terminals requesting this presence data (in this case, for the communications terminal KEG1). In this exemplary embodiment, the list generating device LE is arranged outside the first communications network MFN1 and is operated independently of the first communications network MF1. However, the generating device LE may in another exemplary embodiment also form a component of the first communications network MFN1 or else of a second communications network MFN2, in which case, in this exemplary embodiment, the further communications terminals KEG2 and KEG3 are associated with the second communications network MFN2.

The destination communications terminal KEG1 uses the selection message AN to inform the list generating device LE that it is requesting presence information about the further communications terminals KEG2 and KEG3. Furthermore, the destination communications terminal KEG1 sends type information TYP to the list generating device LE; the type information TYP includes technical features of the destination communications terminal KEG1, for example the type of display unit A and the data formats which can be processed by the destination communications terminal KEG1 and can be displayed on the display unit A. In addition, the destination communications terminal KEG1 sends list structure data LSD to the list generating device LE. This list structure data LSD includes the information about which entries there should in principle be in the list LI which is produced by the list generating device LE and will be sent later to the communications terminal KEG1. The list structure data LSD may, for example, include the information that a list to be produced by the list generating device LE should have the following entries in the form of table columns:

a name of a user of the further communications terminal (for example of the further communications terminal KEG2),
a user status (for example included in a group)
communication options for setting up a link to this user (for example by mobile telephone, landline telephone or e-mail),
the current location of the user (and therefore also, for example, the location of his mobile telephone).

The user is an entity associated with one or more of the respective further communications terminals. Thus, in the example of a mobile telephone, this is a user whose SIM card (subscriber identity module card) is located in the mobile telephone, thus associating this mobile telephone with that user, and hence personalizing it.

With the assistance of the information from the selection message AN and the list structure data LSD, the list generating device LE now produces a call message ABN (for example in the form of a "Get Identity Presence" message constructed in accordance with PAM requirements), including the information about what presence data the list generating device LE requires from a presence computer (presence server) PR. Presence computers PR such as these are known per se and are described, for example, in the document cited initially.

The presence computer PT receives its information inter alia from a first service computer AP1 and from a second service computer AP2. The second service computer AD2 is part of the mobile radio network MFN2. This mobile radio network MFN2 may, for example, be a second generation mobile radio network (GSM), a third generation mobile radio network (UMTS) or a 2.5 generation mobile radio network (GPRS).

In the exemplary embodiment, the second service computer AP2 and a gateway GW are shown of this mobile radio network MFN2. The other elements of the mobile radio network correspond to the elements that are provided as standard in these mobile radio networks, and are not relevant to the description of the method according to the invention. The gateway GW, which, by way of example, is referred to as an OSA-Parlay Gateway which operates in accordance with the OSA or Parlay Standard, connects the first service computer AP1, which is arranged outside the mobile radio network, to the mobile radio network MFN2. The OSA-Parlay Gateway for this purpose provides what is referred to as an open interface I for the first service computer AP1. The second service computer AP2 forms a component of the mobile radio network MFN2 and may, for example, be in the form of a service control point in an intelligent network.

A service computer program runs on the first service computer AP1, by means of which the first service computer AP1 provides a service. In the exemplary embodiment, this is an e-mail service, that is to say the first service computer AP1 makes it possible for the further communications terminal KEG2 to produce e-mail messages, and to receive them. For this purpose, the communications terminal KEG2 is connected to the service computer AP1 via the gateway GW. The communications terminal KEG2 is, for example, a mobile telephone or a portable computer, a laptop or a palmtop with a mobile radio interface. In order to use the e-mail service, the communications terminal KEG2 accesses the first service computer AP1 via the gateway GW. In the process, the communications terminal KEG2 sends a registration message ANN via the gateway GW to the service computer AP1. The communications terminal KEG2 (or its user) uses the registration message ANN to register with the first service computer AP1, in order to use the e-mail service of the first service computer AP1. The registration message ANN sets up a connection between the communications terminal KEG2 and the service computer AP1. The "subscribe" message in the SIP protocol may, for example, be used as such a registration message. The communications terminal KEG2 then sends a start message STN (for example in the form of the "Logging In" message in accordance with the "Wireless Village" requirements) via the gateway GW to the first service computer AP1. This start message STN is used in the first service computer AP1 to start a service computer program D1, which will be explained in more detail later in conjunction with FIG. 2. The service computer program D1 allows the communications terminal KEG2 to create, send and receive e-mail messages. In order to carry out these actions, the communications terminal KEG2 uses a wide range of messages, which are not shown in FIG. 1, to access the service program D1 of the first service computer AP1 and thus causes the service computer program D1 to switch from a first service state in the form of a start state via various further service states (see FIG. 2) to a final service state in the form of an end service state. On reaching the end service state, the service is provided for the communications terminal KEG2 and the communication between the communications terminal KEG2 and the first service computer AP1 is ended. The end service state can either be reached automatically after carrying out a sequential chain of service states, or can be brought about explicitly by sending an end message EN from the communications terminal KEG2 to the first service computer AP1. The "Wireless Village" message "Logging Out" may, for example, be used as such an end message.

Figure 3:
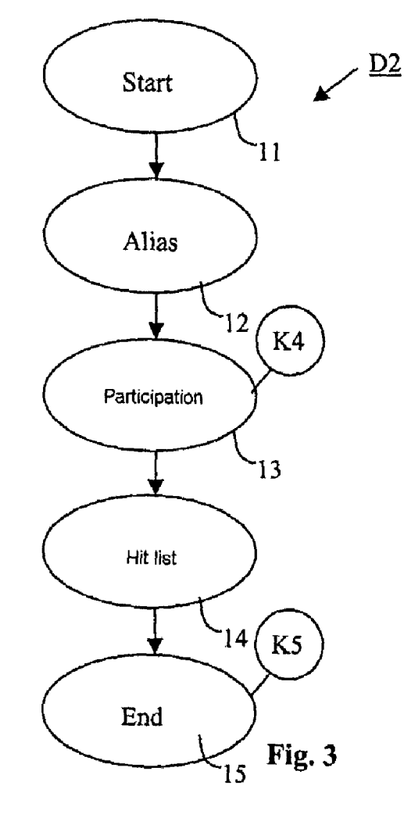
FIG. 3 shows a flowchart of one exemplary embodiment of a second service.

The further communications terminal KEG3 accesses the second service computer AP2 in the mobile communications network MFN2 in a similar way. A service computer program D2 which offers a service in the form of providing an online game for the further communications terminal KEG3 is stored in the second service computer AP2. FIG. 3 shows an example of the sequence of service states for this service computer program D2, and this will be explained later in conjunction with FIG. 3. In this service computer program D2 as well, accesses ZU3 from the further communications terminal KEG3 to the second service computer AP2 result in successive switching from a first service state in the form of a start state via further service states for the provision of the service to a final service state in the form of an end state.

Figure 2:
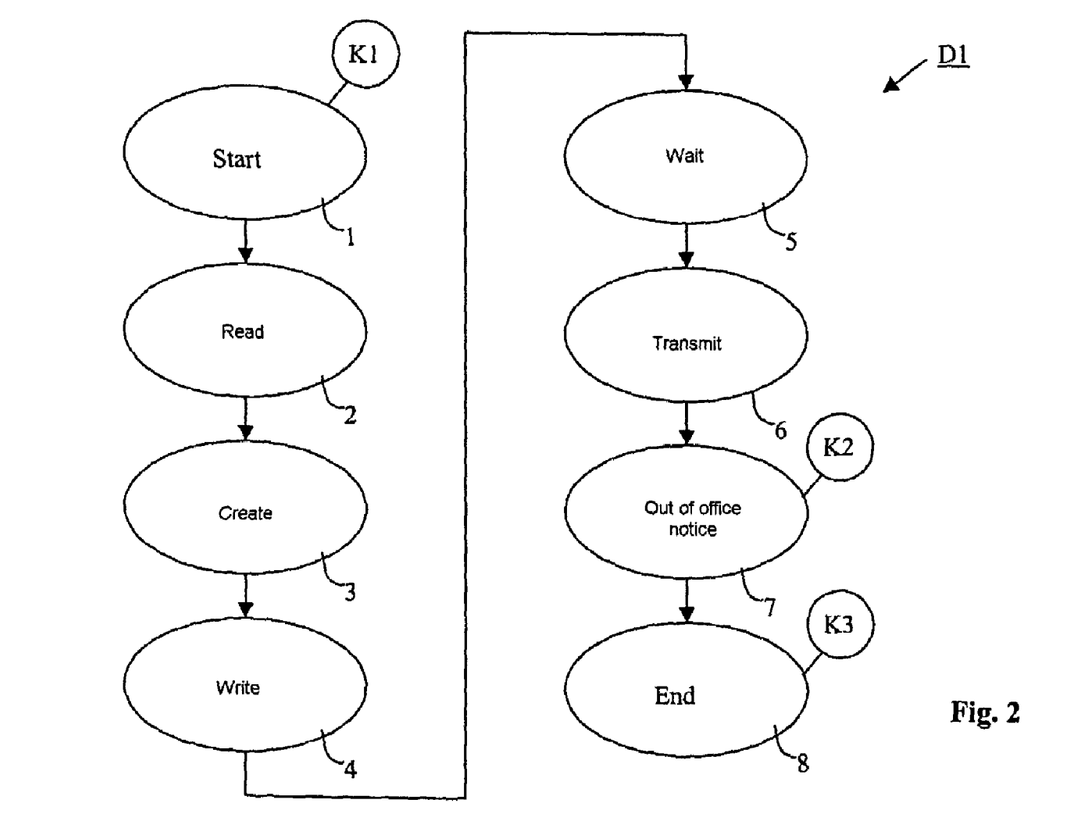
FIG. 2 shows a flowchart of one exemplary embodiment of a first service.

FIG. 2 illustrates the service states which form the service computer program D1. The service computer program D1 allows a telecommunications subscriber to use his telecommunications terminal KEG2 to read, create, write and send e-mail messages. As soon as the communications terminal KEG2 has used the start message STN to start the service computer program D1 in the first service computer AP1, the first service computer AP1 changes to the service state 1 ("Start"). As soon as the communications subscriber starts to read the e-mail messages that have arrived for him by operating the input elements on the communications terminal KEG2, the service computer program changes to the service state 2 ("Read"). If a new e-mail message is then created, the third service state 3 ("Create") occurs. While writing the text for the newly created e-mail message, the service state 4 ("Write") occurs. If the communications terminal 2 does not access the first service computer AP1 (because the communications subscriber has, for example, interrupted the writing of the e-mail message), then a service state 5 ("Wait") occurs. When the complete e-mail message is sent, the first service computer AP1 changes to the service computer state 6 ("Transmit"). As soon as the communications subscriber uses the communications terminal KEG3 to produce an out of office notice (by means of which the senders of e-mail messages which are received are informed that the communications subscriber is not at his normal location but is at some other location, for example traveling on business), the service computer program D1 changes to the service state 7. Finally, at the end of the service program D1 (for example by closing the e-mail client on the communications terminal KEG2 by means of the end message EN), the final service state 8 ("End") occurs. At this point, it should be mentioned that service programs may, of course, also have more complicated state sequences (for example with branches).

FIG. 3 shows, symbolically, the service states of the second service computer program D2, which makes it possible for the further communications terminal KEG3 to take part in an online game. The further service computer program D2 has five service states 11 to 15. The first service state 11 describes the start of the service computer program as a reaction to an access ZU3 from the further communications terminal KEG3 to the second service computer AP2. The second service state 12 occurs when the further communications terminal KEG3 selects an identification name (alias name) for participation in the online game. The third service state 13 occurs when the further communications terminal KEG3 carries out access procedures in order to play the game or to take part in the actual game steps of the online game. The fourth service state 14 occurs when the game results are assessed by the second service computer AP2 and the alias name is recorded in a hit list, and the final service state 15 occurs when the further service computer program D2 is ended, for example, by an end message from the communications terminal KEG3.

The presence computer PR that is illustrated in FIG. 1 is notified by reception of the call message ABN of the presence data which the list generating device LE requires. The presence computer PR thus creates a first definition message BN2 and sends this via the gateway GW to the first service computer AP1. The definition message BN2 contains the information that the presence computer should be informed by the first service computer AP1 when the communications terminal KEG2 accesses the service computer program D1 in the first service computer AP1 and, in consequence, the service states 1 (Start), 7 (Out of Office Notice) and 8 (End) occur in the service computer program in the first service computer AP1. The service computer AP1 then identifies these three service states 1, 7, 8 as predetermined service states. This is done by allocating a first identifier K1 to the first service state 1, a second identifier K2 to the seventh service state 7 and a third identifier K3 to the eighth service state 8 (see FIG. 2). In detail, this identification process can be carried out by loading identification values in memory locations which are associated with the service states 1, 7 and 8. As soon as one of the three predetermined service states is now reached during the running of the service computer program D1, the first service computer AP1 sends a presence message PN2 via the gateway GW to the presence computer PR, with the presence message PN2 containing information (for example a code) about the service state which has been reached and has occurred and about the communications terminal KEG2 (which has initiated the reaching of this state by means of its access). A "Set Identity Presence" message constructed in accordance with the PAM requirements may, for example, be used as a presence message PN2 such as this. The presence computer PR reads the information from this presence message PN2, stores this information in a data memory that is provided for this purpose, and transmits this information in the form of presence data PD (for example as a "Get Identity Presence Response" message configured in accordance with the PAM requirements) to the list generating device LE.

Alternatively, the service states to be monitored to obtain the presence data PD can also be predetermined in the manner described in the following text.

Figure 4:
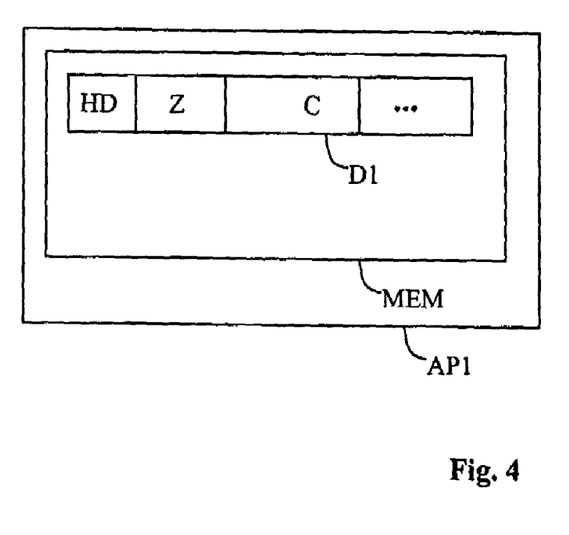
FIG. 4 shows one exemplary embodiment of a service computer.

FIG. 4 shows the first service computer AP1 with a main memory MEM. The service computer program D1, which comprises at least three main components, is loaded in the main memory MEM. A first memory area contains a header part HD which identifies the program. A second memory area contains state data Z which describes the service states 1 to 8 which may occur while running the service program D1. A third memory area includes the actual program code C.

The first service computer AP1, which is illustrated in FIG. 1, reads from its memory MEM the "State data Z" data set for the service computer program D1.

Figure 5:
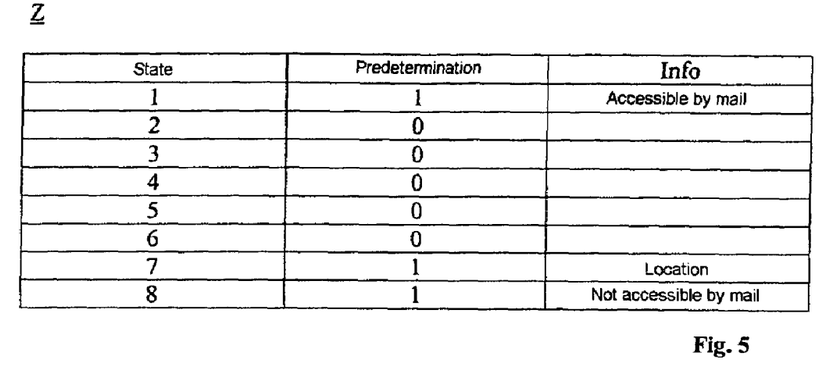
FIG. 5 shows one exemplary embodiment of state data which is associated with one service.

FIG. 5 shows the contents of the state data Z in the form of a table. The eight states of the service computer program D1 are listed in a first "State" table column, "Predetermination" is identified in a second table column by means of the values 0 and 1, these being the states which can be used as predetermined service states (0=not a predetermined service state, 1=predetermined service state). A third "Info" table column describes what presence information can be derived from the occurrence of the respective service state. In this example, the first service state 1 ("Start") of the service computer program D1 should be regarded as a predetermined service state since, once this predetermined service state 1 has been reached, the communications terminal KEG2 can be accessed by e-mail. Accessibility by e-mail represents a presence characteristic. Furthermore, the state 7 ("Out of Office Notice") should be regarded as a predetermined state because an out of office notice such as this is used by a communications subscriber at the communications terminal KEG2 to indicate that the communications subscriber is not at his normal location but is at a different location which is specified in more detail by location details. This new location which is applicable after reaching the predetermined service state 7 likewise represents presence information which can be evaluated. Finally, the service state 8 ("End") should also be regarded as a predetermined service state since, when the service state is reached, the e-mail service to be provided for the communications terminal KEG2 in the first service computer AP1 is ended, and the communications terminal KEG2 is not accessible by e-mail after this.

After evaluation of this state data, the service computer AP1 identifies from the set of eight service states in the service computer program D1 the service states 1, 7 and 8 as predetermined service states, because these service states relate to the accessibility of the communications terminal KEG2 or its communications subscriber. In the rest of the process, the first service computer AP1 will monitor the running of the service computer program D1 to determine whether the predetermined service states 1, 7 or 8 occur when the communications terminal KEG2 is using the service. If these predetermined service states 1, 7 or 8 occur, presence messages PN2—as described above—will be sent to the presence computer PR.

If the first service computer AP1 automatically (possibly after evaluation of the state data Z in the service computer program D1) identifies the service states which are relevant for the presence service as predetermined service states, then the service computer AP1 sends a message about these service states which are predetermined by it, in the form of a signaling message MN2 to the presence computer PR. This informs the presence computer PR of which service states are currently identified in the first service computer AP1 as predetermined service states and of what information can potentially be transmitted in the form of presence messages PN2 from the first service computer AP1 to the presence computer PR. If the presence computer PR finds that individual information items which are requested from it by means of the request message ABN cannot be waited for by the first service computer AP1, then the presence computer PR will request this information from other information sources, for example from further networks N1 and N2 which are connected to the presence computer, and will ask for such information there.

In the exemplary embodiment, presence messages PN1 which are requested in this way originate from a second generation mobile radio network N1 (that is to say, by way of example, from a mobile radio network which is operating in accordance with the GSM Standard). Presence messages such as these may, for example, comprise which further communications terminals (which are not shown in the figure) are currently registered with the mobile radio network N1 (that is to say are logged in) or to which further communications terminals mobile radio links can currently be set up via the network N1. Further presence information which is transmitted by means of a presence message PN4 originates from a third generation mobile radio network N2, that is to say for example from a mobile radio network which is operating in accordance with the UMTS Standard (UMTS=Universal Mobile Telecommunications System) or in accordance with the GPRS Standard (GPRS=General Packet Radio Service). The presence message PN4 may, for example, include the information as to which further communications terminals can currently be accessed via the mobile radio network N2.

The further communications networks N1 and N2 may have similar configurations to those illustrated in conjunction with the mobile radio network MFN2 in FIG. 1.

The e-mail service which is offered by the first service computer AP1 comprises more than merely providing basic communication functions for the communications terminal KEG2 (mobile telephone)—a basic communication function such as this would be the transmission of voice messages or the transmission of SMS messages. The service D1 thus represents a value added service which provides a communications subscriber using the communications terminal KEG2 with additional services beyond the basic services that are offered as standard.

Analogously to the procedures described so far in conjunction with the first service computer AP1, the second service computer program D2 is installed in the second service computer AP2. In the service computer program D2, the third service state 13 and the fifth service state 15 are identified as predetermined service states (identifiers K4 and K5, see FIG. 3). Consequently, on reaching one of the service states, the second service computer AP2 sends a presence message PN3 to the presence computer PR, including information about the respective predetermined service state that has occurred and about the respective communications terminal—in this case about the further communications terminal KEG3.

In this way, the presence messages PN1 to PN4 provide the presence computer PR with presence information about a large number of widely differing further communications terminals, of which the further communications terminals KEG2 and KEG3 have been mentioned, by way of example. The presence computer PR uses the call message ABN to choose from this set of individual presence data that presence data which is required by the list generating device LE for the first communications terminal KEG1, and sends the presence data PD to the list generating device LE. The list generating device LE sends the type information TYP, which is received from the first communications terminal KEG1, to a data memory S, stored in the format data FD, and describing the data formats which can be displayed on the display unit A of the first communications terminal KEG1. The format data FD which is associated with the first communications terminal KEG1 is read from the data memory and is transmitted to the list generating device LE. The format data in particular includes information about the data format or file format in which the list is sent to the first communications terminal KEG1 (for example using the HTML format (HTML=hypertext markup language) using the http protocol (http=hypertext transfer protocol), as an XML document (XML=extensible markup language), in the ASCII format, or as a PDF file). Using the format data FD, the list generating device LE uses the presence data PD to produce a list LI which is in a data format which can be displayed on the display unit A of the first communications terminal KEG1. The list LI is transmitted from the list generating device LE via the switching center VST to the first communications terminal KEG1, where it is displayed on the display unit A.

The display unit A of the first communications terminal KEG1 is now used to display the information that the further communications terminal KEG3 has now started an online game application on the second service computer AP2 and, consequently, communication with the communications terminal KEG3 can be set up by participation in the online game. The display A likewise shows that the further communications terminal KEG2 has started an e-mail application in the first service computer AP1 and that, consequently, it is possible to communicate with the further communications terminal KEG2 by e-mail. The display of the currently existing communication capability on the display unit A may be provided by outputting small-format images (icons). By way of example, an envelope may be displayed as an image such as this to show symbolically that the communications terminal KEG2 can be accessed by e-mail. In order to visualize the fact that the communications terminal KEG3 is currently accessible via the online game, it is likewise possible to output an image which describes the respective online game—for example an illustration of four dominoes for an online strategy game that is currently being played. The corresponding small-format image is marked or activated on the display A of the first communications terminal KEG1 (for example by positioning a cursor on the corresponding image and by operating a control element, for example a key, on the first communications terminal) in order to start a corresponding computer application (which, for example, represents a computer program, a communication program) on the first communications terminal, and a communications link can be set up via this between the first communications terminal KEG1 and the corresponding further communications terminal KEG2 or KEG3. Thus, when the symbol for e-mail communication is selected on the first communications terminal KEG1, then an e-mail client (e-mail program) is started on this first communications terminal KEG1, and can be used by the user of the first communications terminal KEG1 to directly set up a communication link to the first service computer AP1, for the e-mail program D1 in the second communications terminal KEG2. This advantageously makes it possible to set up and carry out communication between the first communications terminal KEG1 and the second communications terminal KEG2 in a very convenient manner.

When creating the list LI, the list generating device LE produces charge data VD relating to the nature and scope of the list LI that is created, and allowing this to be billed to the communications terminal KEG1 or to a user of this first communications terminal. In order to create the charge data VD, the list generating device LE determines and records various features relating to the creation of the list. In particular, the following items can be used to produce the charge data VD:

the number of users to be monitored as defined by the selection message AN and their communications terminals (landline telephone, mobile telephone or e-mail client)

the nature of the applications used by the further communications terminals (for example the programs D1 and D2 on the first service computer AP1 or on the second service computer AP2), the scope of the list as it has been defined by the list structure data LSD, the type of the first communications terminal KEG1 the frequency of occurrence of new updated presence data, and the number of presence information items provided by the presence server per further communications terminal.

The list generating device LE uses these features, which have been mentioned by way of example, to determine a charge amount which will be charged to the communications terminal KEG1 or to the user of this communications terminal. In this case, the amount to be transferred with the charge data VD can be determined by an addition of the individual charge amounts which are associated with each of the features mentioned above. Alternatively, a pro rata charge can also be provided for use of the method for displaying presence data, and this is produced and processed as charge data VD.

In one aspect of the method, the charge data VD is transmitted from the list generating device LE to the switching center VST in the first communications network MFN1.

The switching center VST then produces charge tickets T which are associated with the charge data, and sends these to a charge billing device in the form of a postpaid bill production device PP. Bill production devices such as these are known per se in mobile telephone networks and are used to produce the charge invoices, to be sent monthly, for example, for the mobile telephone calls made. After receiving the charge tickets T, the service for obtaining the presence data PD and/or the service for displaying the presence data PD on the display unit A of the first communications terminal KEG1 is invoiced via such a charge billing device.

In another aspect, the charge data VD is sent via the switching center VST to the service switching point SSP in the first communications network MFN1, which is in the form of an intelligent network. The service switching point SSP starts a charge billing service at the service control point SCP which is associated with it, and sends the charge data VD to this service control point SCP. The service control point maintains a credit account GK which is associated with the first communications terminal KEG1 and causes the appropriate charge amount to be debited from the credit account GK. The administration and maintenance of credit accounts in mobile radio networks is known per se and is referred to as prepaid charge billing.

The communication between the first service computer AP1 or the second service computer AP2 and the presence computer PR may take place, for example, using one of the methods described in the following text.

Use of the SIP protocol: SIP (Session Initiation Protocol) mechanisms exist which allow information to be distributed, for example the SUBSCRIBE/NOTIFY, PUBLISH, or MESSAGE methods.

Use of the SOAP or XML protocols via HTTP or Sockets: the generic protocol SOAP can be used to define an interface which allows the information to be passed to the presence server, and which allows both the presence server and the service computer to specify the information of interest. This can also be done by means of a proprietary protocol, which is based on XML or simple character chains, with this protocol being transported via HTTP, TCP or UDP Sockets.

Use of CORBA, RMI: these technologies likewise make it possible to define an interface which allows the necessary data to be interchanged. This interface may either be standardized (PAM Forum, Parlay, 3GPP OSA) or proprietary.

Use of the BEEP protocol: the BEEP protocol from IETF can likewise be used for interchanging data.

What is claimed is:

1. A method for obtaining presence data for processing in a presence computer, comprising:

accessing, via a communications terminal, a service computer to use a service which is offered by the service computer;

identifying, via the service computer, the occurrence of a predetermined service state which identifies the communications subscriber; sending, via the service computer, a presence message to the presence computer, which presence message includes information about the service state that has occurred and about the communications terminal; and processing, via the presence computer, the information in the presence message to form presence data.

2. The method as claimed in claim 1, wherein the presence computer transmits a definition message to the service computer, which includes information about the service states to be identified by the service computer, the service computer identifies the service states as predetermined service states, and the service is monitored for the occurrence of the predetermined service states.

3. The method as claimed in claim 1, wherein the service computer identifies from a set of service states the service states as predetermined service states which result in a change in the accessibility of the communications terminal, and the service is monitored for an occurrence of the predetermined service states.

4. The method as claimed in claim 1, wherein the service computer reads state data which is stored in a service computer program, with the state data including information about the service states which occur during running of the service computer program on the service computer.

5. The method as claimed in claim 3, wherein the service computer uses a signaling message to transmit information about the predetermined service states to the presence computer.

6. The method as claimed in claim 1, wherein an occurrence of a predetermined service state is identified when the communications subscriber registers as a service user with the service computer.

7. The method as claimed in claim 1, wherein an occurrence of a predetermined service state is identified when the communications subscriber starts a service computer program on the service computer.

8. The method as claimed in claim 1, wherein an occurrence of a predetermined service state is identified when the communications subscriber ends a service computer program on the service computer.

9. The method as claimed in claim 1, wherein a service formed as a value added service is accessed.

10. The method as claimed in claim 1, wherein the service computer forms a node of a mobile radio network which is connected to the presence computer.

11. The method as claimed in claim 1, wherein the service computer is connected via an open interface to a mobile radio network which is connected to the presence computer.

12. The method as claimed in claim 11, wherein the open interface is formed by an OSA/Parlay Gateway.

* * * * *